Feb. 16, 1926.
H. MILKER
1,572,900
AUTOMATIC CONTROL SYSTEM
Filed August 24, 1923    2 Sheets-Sheet 1
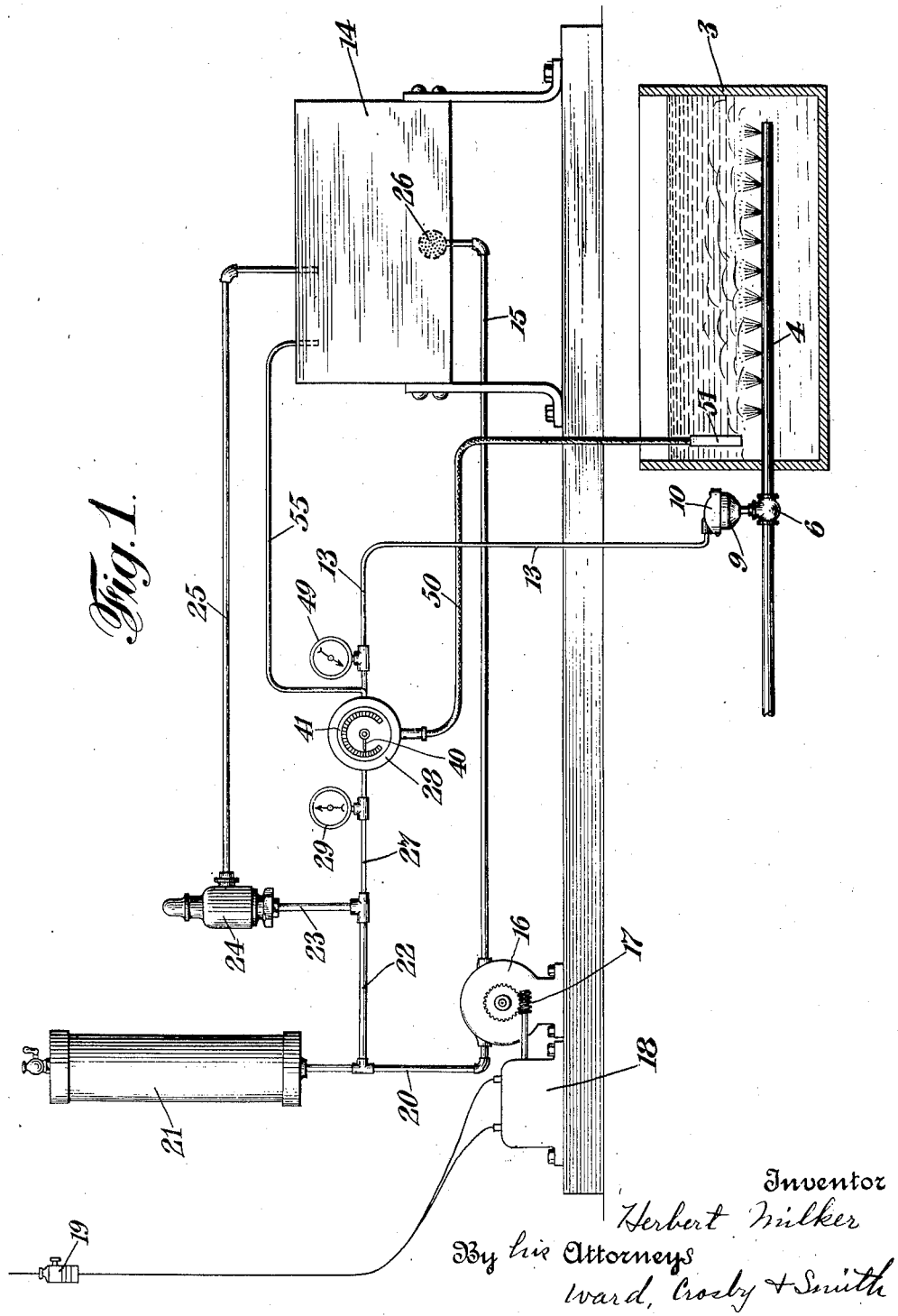
Inventor
Herbert Milker
By his Attorneys
Ward, Crosby + Smith

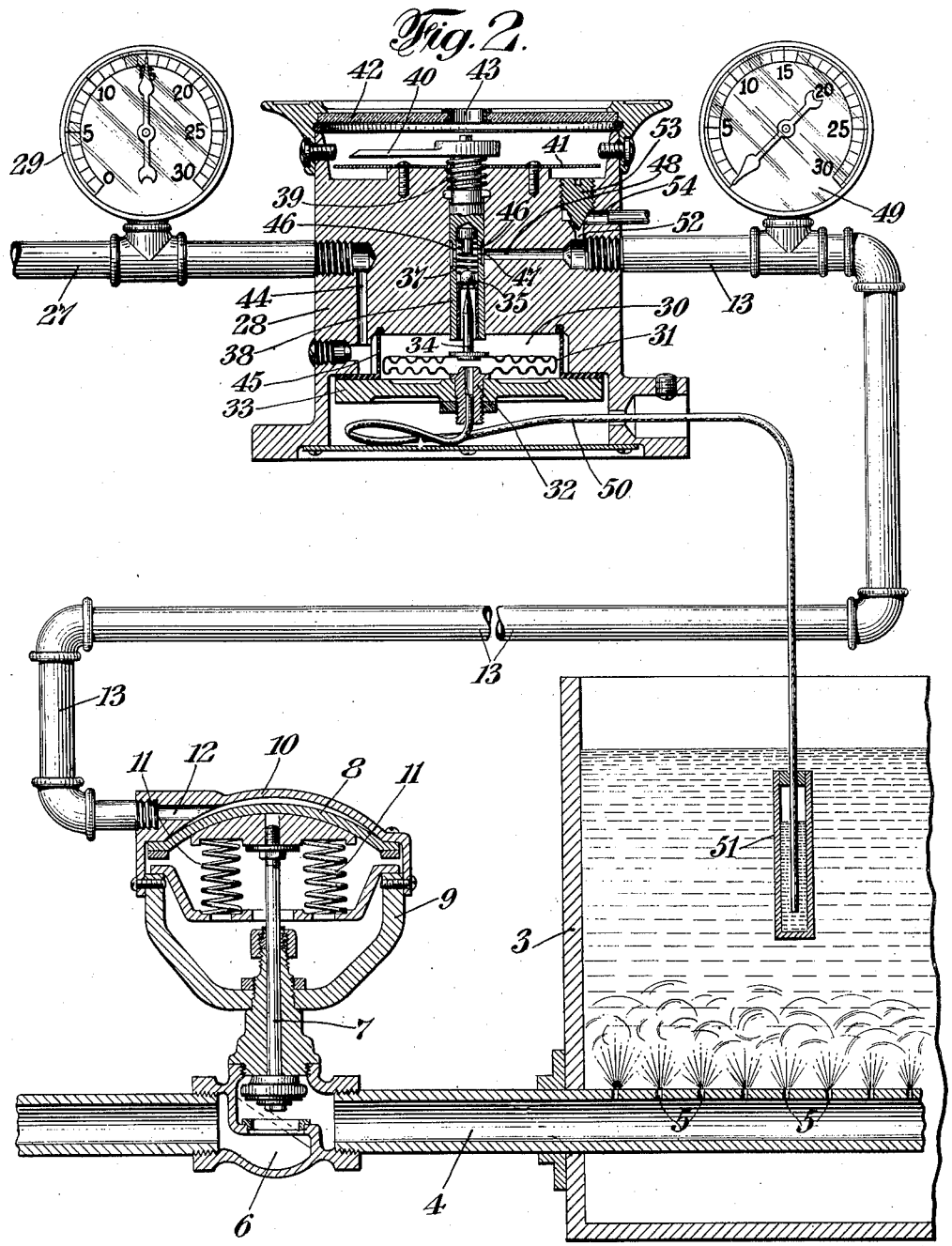

Patented Feb. 16, 1926.

1,572,900

UNITED STATES PATENT OFFICE.

HERBERT MILKER, OF BROOKLYN, NEW YORK, ASSIGNOR TO AMERICAN SCHAEFFER & BUDENBERG CORPORATION, OF BROOKLYN, NEW YORK, A CORPORATION OF NEW YORK.

AUTOMATIC CONTROL SYSTEM.

Application filed August 24, 1923. Serial No. 659,132.

*To all whom it may concern:*

Be it known that I, HERBERT MILKER, a citizen of the United States, and resident of Brooklyn, county of Kings, State of New York, have invented certain new and useful Improvements in Automatic Control Systems, of which the following is a specification.

My invention relates to automatic control systems and more particularly to arrangements which utilize a fluid under pressure to operate a valve or other device. The main object of the invention is to obtain a simple dependable and relatively inexpensive arrangement for providing fluid under pressure in a system of the class in question. The improved system may be used for controlling temperature, pressure, humidity or other condition at any given point or place.

Heretofore it has common in such controllers using fluid pressure for operating the valve or fluid pressure operated device, to use as a fluid, either air under pressure or water under pressure. When air is used much trouble is occasioned by oil or oil vapors from the parts and by moisture and water vapors carried along by the air, which through oxidation and the gathering of dust cause the air valve and passages to clog. Elaborate and expensive adjuncts such as separate air refrigerating and cleaning systems have been applied in an effort to secure clean dry air, but without material improvement. When water has been used it is usually obtained from a service main roof tank or well and the impurities is suspension or solution are often found to have a corrosive effect on the mechanism such as to cause much trouble. Even though the shortcomings of air operated controllers might be put up with, the benefits of such automatic control are often dispensed with because of the expense and nuisance of installing and operating an air compressor. With my improved system in its best form, these disadvantages are substantially obviated and a simple dependable and relatively inexpensive control is provided which will regulate with very satisfactory closeness.

In carrying out my invention I preferably use a comparatively small volume of operating fluid and use this over and over again instead of, as heretofore, continuously drawing on a fresh supply of compressed air or water for the purpose.

Further objects, features and advantages will more clearly appear from the detail description given below taken in connection with the accompanying drawings which form a part of this specification. In the drawings, Fig. 1 is a diagram illustrating a system embodying my improvements in a preferred form thereof and Fig. 2 is a sectional view of certain parts of such a system which more clearly illustrate the same.

Referring to the drawings I have there illustrated my improvements in connection with automatic temperature control, although as above indicated the invention may be used in connection with the automatic control of pressure, humidity or other condition. In the particular form shown, 3 represents a tank containing a bath, the temperature of which it is desired to maintain substantially constant. For this purpose a steam pipe 4 extends into the tank and is provided with suitable openings 5 through which the steam may escape into the bath to heat the same. 6 represents a valve in the pipe 4 for shutting off or throttling the supply of steam to the bath in tank 3 when the temperature thereof has reached the desired point. The valve 6 is operated by a spindle 7 having connected to its upper end a flexible diaphragm 8 located within a suitable casing 9 provided with a cap piece 10. The valve is normally held in open position by springs 11 and the cap 10 is provided with an opening 12 therethrough to which opening is connected a fluid supply pipe 13, so that when the fluid under pressure is supplied through pipe 13 to the space within the cap 10 above the diaphragm 8 and such fluid pressure is sufficient to overcome the springs 11, and steam pressure underneath the valve disc, the diaphragm 8 is forced downwardly causing the valve 6 to close and shut off the supply of steam to the tank 3.

14 represents a sump which consists of a suitable tank having a pipe line 15 leading from the bottom thereof to a gear or centrifugal type pump 16. Pump 16 is operated through a worm 17 by electric motor 18 which in the form shown receives energy from electric light socket 19. Pipe line 20 is connected to the outlet of pump 16 and has connected thereto an air cushion chamber 21. Between the pump 16 and chamber 21 a pipe line 22 leads from the pipe 20, and connected to the pipe 22 is a by-pass 23 leading to a relief valve 24 which has an outlet pipe 25 connected thereto, which pipe 25 returns to the sump 14. A screen 26 is preferably placed over the end of pipe 15 in the bottom of the sump 14 and a suitable amount of oil or other fluid medium is placed in the sump 14. Upon operating the pump 16, the latter pumps the oil from the sump 14 through pipe 15 into pipe line 20, 22, 23 and when the pressure of the oil or fluid in pipe line 20, 22, 27 and 23 reaches a predetermined value, the excess fluid will escape through relief valve 24 and pipe 25 to the sump 14, so that fluid under substantially constant pressure is maintained in the pipe line 20, 22, 27 and 23 and forms a suitable source of fluid under pressure for operation of the parts as hereinafter described.

Leading from the pipe 22 is a pipe 27 leading to a controller 28. A pressure gauge 29 is shown connected to the pipe 27 which registers the pressure in pipe line 20, 22, 23 and 27.

As shown in Fig. 2 the controller 28 is provided with a closed chamber 30 in which is located an expanding-contracting chamber 31 comprising two corrugated metal disks integral or otherwise connected together at their edges. The lower disk is secured to nipple 32 threaded in the base piece 33 which is rigidly secured to the bottom of and forms a part of controller 28. The upper corrugated disk has connected thereto a spindle 34 pointed at its upper end and which, when forced upwardly, is adapted to engage a ball valve 35 normally held against its seat by a coil spring 37. The spring 37 and the valve 35 with its seat are located in a tubular member 38 screw-threaded into the body part of the controller at 39 and at its upper end this member has rigidly secured thereto a pointer 40 cooperating with dial 41 rigidly secured in the top part of the controller and which is visible through a glass window 42, which window has an aperture 43 through the center thereof to permit of the insertion of a suitable tool for turning pointer 40 and member 38 so as to adjust the same vertically in the controller and thus adjust the point at which the spindle will open the ball valve 35.

The pipe 27 is connected with a passageway 44 in the body of the controller which passageway leads to the chamber 30 through a cylindrical screen 45. The tubular member 38 is cut away on its outside periphery at 46 and provided with apertures therethrough to the inside thereof at 47 and substantially opposite these apertures and opposite the cut away part 46, the controller is provided with a passage 48 which is connected to pipe line 13. The pressure gauge 49 is shown connected to the pipe line 13 to indicate the pressure therein.

The nipple 32 is centrally apertured and rigidly connected thereto is a flexible tube 50 of small diameter which leads into a hollow bulb 51 located within the tank 3, the temperature of which is to be regulated. The passage 48 in the controller has leading upwardly therefrom a by-passage 52 which may be more or less closed by a small hand operated conical valve 53, from which the passage 54 leads to the pipe 55 which in turn leads into the sump 14.

In order to avoid the disadvantages of air and water as a pressure medium, I preferably use an oil as the fluid pressure medium. A mixture of glycerin and alcohol I also find to be suitable. The fluid should preferably be of a lubricating nature to save wear on the pump and should not be of too high viscosity and it should also preferably have a low freezing point and also be one which has no chemical action on the parts and contains no deleterious substance.

Upon placing a suitable quantity of such oil or other fluid in the sump 14 and starting the motor 18, the pump 16 is operated to receive fluid from the sump through the strainer 26 which removes therefrom any foreign particles, and the fluid flows through the pipe 15 and is pumped into the pressure line 20, 22, 23 and 27, the air cushion 21 serving to substantially smooth out any pump pulsations. When the pressure of the fluid in the pipe line 20, 22, 27, 23 has reached a predetermined point for which the adjustable relief valve 24 is set, the excess fluid over and above that required to maintain constant pressure in the pipe line 20, 22, 23 and 27 will escape through the by-pass pipe line 25 into the sump 14 to be used over and over again. With the valve 6 normally opened, steam will be passing through the pipe 4 into the tank 3 and will heat up the bath therein. When the temperature of the bath reaches the desired predetermined point, the fluid with which the thermometer bulb 51 is filled, expands sufficiently to create a pressure in the chamber 31 with which the tube 50 is connected and so raise the spindle 34 to a point where it will open the ball valve 35. This permits the fluid under substantially constant pressure from pipe 27 to flow through passage 44, through screen 45 filling chamber 30, up about the spindle 34, passing the ball valve 35, out through apertures 47 and into passage 48 and pipe 13, through the pipe 13 and the space above the diaphragm 8 under cap 10 until the pressure of the fluid in pipe 13 and under cap 10 has reached such a value that it will overcome the springs 11 and close valve 6, thus shutting off the supply of steam to the tank 3 and preventing the temperature thereof from going any higher. The pressure of the fluid in pipe 13 is indicated by the pressure gauge 19. When the temperature in the tank 3 drops below the predetermined value, the diminished pressure will permit the chamber 31 to contract and the spindle 34 to be withdrawn and ball valve 35 closed under the action of spring 37, whereupon the pipe line 13 is disconnected from the constant pressure supply in pipe line 20, 22, 23 and 27. The adjustable valve 53 is so adjusted as to continuously permit a small leakage of fluid thereby through passages 52 and 54 so that when the ball valve 35 is closed, fluid under pressure in pipe line 13 is permitted to slowly flow out through passages 52 and 54 and pipe 55 back to the sump 14. In this way the pressure of the fluid under cap 10 is relieved and the springs 11 cause the valve 6 to be opened so that the steam is again permitted to enter the tank 3 through pipe 4 and cause the temperature thereof to be raised, and when it again reaches the desired point the ball valve 35 is opened as before causing the pressure to be again supplied to the pipe line 13 and under cap 10 and the closing of the valve 6, so that the temperature of the bath in tank 3 is thus maintained substantially constant.

From the foregoing it will be seen that a very compact, simple and efficient arrangement is secured in which there is always provided a clean supply of motive fluid under pressure for use with the automatic controller, and which fluid is constantly recirculated through the system so that it is used over and over again. By being able to use the fluid over and over again, it is possible to efficiently use a relatively expensive fluid which has no substantial deleterious effects on the various parts of the mechanism, such as has heretofore resulted from the use of air or water as motive fluid. The fluid furnished by the pump 16 and which is in excess of that required to maintain the desired constant pressure is permitted to escape through the relief valve 24 and back to the sump 14, and when the ball valve 35 is closed, the excess fluid in pipe line 13 is permitted to flow out through the passages 52 and 54 and pipe 55 back to the sump. It should be understood that when ball valve 35 is open there will also be some leakage of motive fluid through these passages and back to the sump but not sufficient to prevent sufficient pressure being had on the motive fluid in pipe line 13 to close the valve 6. It will also be understood that a plurality of controllers etc. may receive their motive fluid from supply under pressure in pipe line 20, 22, 23 and 27 and the excess or discharge fluid from each of these controllers etc. may be returned by similar pipes to the sump. These controllers etc. may be quite different in character and regulate for entirely different conditions.

While I have described my improvements in great detail and with respect to one application thereof in a preferred form, I do not desire to be limited to such details, form or application since many changes and modifications may be made and the invention embodied in widely different forms without departing from the spirit and scope thereof in its broader aspects.

What I claim as new and desire to secure by Letters Patent, is:

1. A fluid pressure operated automatic controlling arrangement having in combination, a conduit in which the fluid is kept under substantially constant pressure, a pump for pumping the fluid into said conduit under pressure, a sump serving as a source of the fluid for said pump, a pressure releasing valve connected to said conduit and sump adapted to return fluid from the said conduit to the sump when the pressure in said conduit exceeds a predetermined value, a control valve connected to said conduit under pressure, a main valve to be operated, said last mentioned valve having pressure operating means to operate it which is connected to said control valve whereby when the control valve is open the fluid under pressure will operate said main valve, fluid pressure operated means for operating said control valve, and a conduit containing fluid, the pressure of which is adapted to vary to operate said fluid pressure operated means.

2. A fluid pressure operated automatic controlling arrangement having in combination, a conduit in which the fluid is kept under substantially constant pressure, a pump for pumping the fluid into said conduit under pressure, a sump serving as a source of the fluid for said pump, a pressure releasing valve connected to said conduit and sump adapted to return fluid from the said conduit to the sump when the pressure in said conduit exceeds a predetermined value, a control valve connected to said conduit under pressure, a main valve to be operated, said last mentioned valve having pressure operating means to operate it which is connected to said control valve whereby when the control valve is open the fluid under pressure will operate said main valve, fluid pressure operated means for operating said control valve, a conduit containing fluid, the pressure of which is adapted to vary to operate said fluid pressure operated means, a connection whereby fluid from the pressure operating means of the main valve may return to said sump and means for regulating the passage of fluid to the sump therethrough.

3. A fluid pressure operated automatic controlling arrangement having in combination, a conduit in which the fluid is kept under substantially constant pressure, a pump for pumping the fluid into said conduit under pressure, a sump serving as a source of the fluid for said pump, a pressure releasing valve connected to said conduit and sump adapted to return fluid from the said conduit to the sump when the pressure in said conduit exceeds a predetermined value, a control valve connected to said conduit under pressure, a main valve to be operated, said last mentioned valve having pressure operating means to operate it which is connected to said control valve whereby when the control valve is open the fluid under pressure will operate said main valve, fluid pressure operated means for operating said control valve, a conduit containing fluid, the pressure of which is adapted to vary to operate said fluid pressure operated means, a bulb attached to said last mentioned conduit whereby changes in temperature of the bulb will vary the pressure of the fluid in said last mentioned conduit, and an expansion chamber connected to said conduit which is kept under substantially constant pressure.

In testimony whereof I have signed my name to this specification.

HERBERT MILKER.